Figure 1:
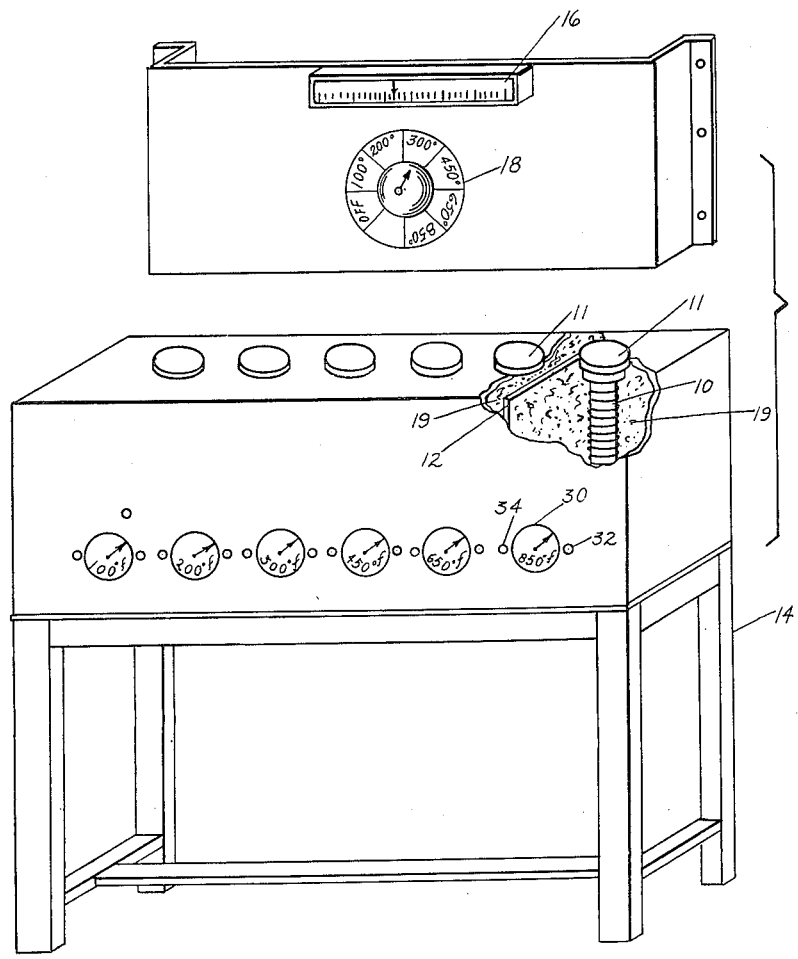

Dec. 26, 1950 P. MARTIN 2,535,083
APPARATUS FOR CALIBRATING DISTANT-READING
TEMPERATURE DEVICES
Filed June 21, 1946 2 Sheets-Sheet 1

INVENTOR.
PHILIP MARTIN
BY *M. O. Hayes*
ATTORNEY

Dec. 26, 1950   P. MARTIN   2,535,083
APPARATUS FOR CALIBRATING DISTANT-READING
TEMPERATURE DEVICES
Filed June 21, 1946   2 Sheets-Sheet 2
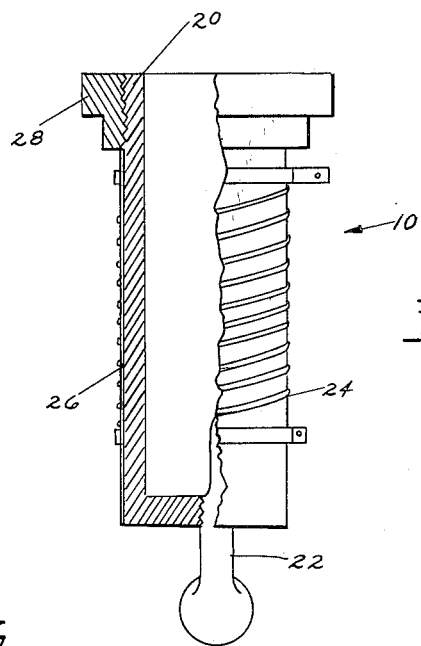
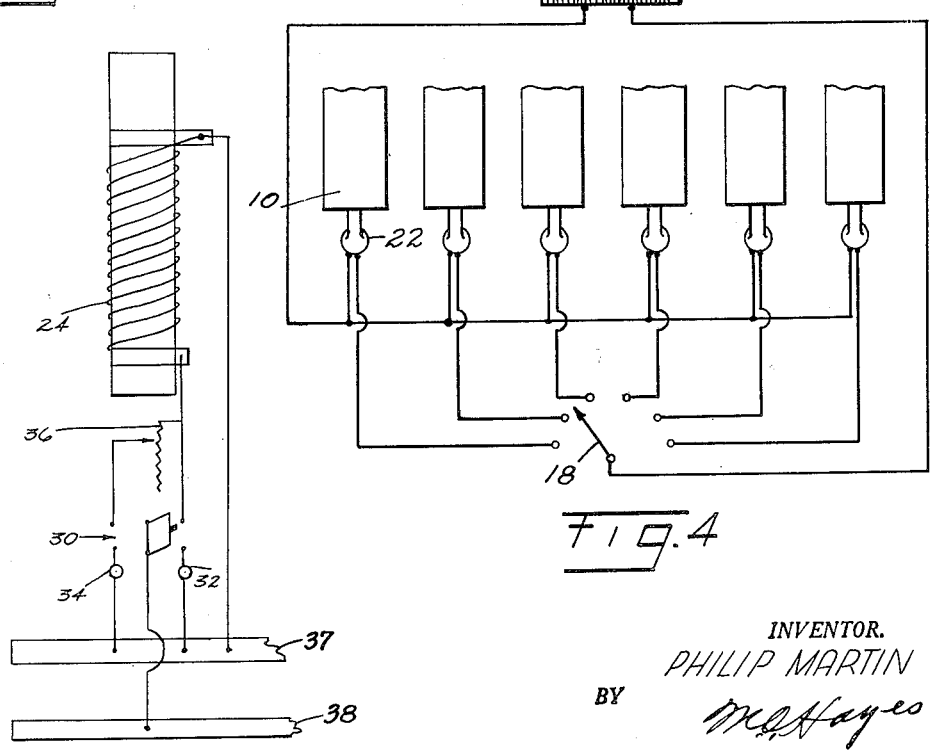
INVENTOR.
PHILIP MARTIN
BY
ATTORNEY Patented Dec. 26, 1950

2,535,083

UNITED STATES PATENT OFFICE 2,535,083

APPARATUS FOR CALIBRATING DISTANT-READING TEMPERATURE DEVICES

Philip Martin, New York, N. Y.

Application June 21, 1946, Serial No. 678,178

1 Claim. (Cl. 73—1)

(Granted under the act of March 3, 1883, as amended April 30, 1928; 370 O. G. 757)

This invention relates to apparatus for calibrating temperature indicators and in particular to apparatus for the testing and calibrating of distant-reading temperature indicators.

An object of this invention is to provide a safe and easily operated apparatus for testing and calibrating temperature indicators.

Another object is to provide apparatus with which a temperature indicator can be accurately calibrated with little loss in time while heating or cooling the apparatus.

Further objects and advantages of this invention, as well as its construction, arrangement, and operation will be apparent from the following description and claim in connection with the accompanying drawings, in which, Fig. 1 is an oblique view of one embodiment of this invention with parts illustrated as cut away to show the location of a heating element, Fig. 2 is a side view partly in cross section, of a heating element of the apparatus shown in Fig. 1, and Fig. 3 is a wiring diagram of one of the heating elements of the apparatus shown in Fig. 1.

Fig. 4 is a diagrammatic view showing a conventional electric circuit interconnecting the pyrometer, the thermocouples, and the selector switch.

Indicators of the type to be tested and calibrated by this apparatus, such as distant-reading thermometers, superheated-steam temperature gauges, thermoswitches and temperature alarms are remotely operated by gas pressure or vapor pressure produced by application of heat to the indicator bulb at the point where the temperature is to be measured. Hereinafter in the specification and claim, the term "gas-pressure-type temperature devices" is used to indicate distant-reading thermometers, superheated-steam temperature gauges, thermoswitches and temperature alarms of either gas-pressure type or vapor-pressure type.

There is shown in Fig. 1 one of a plurality of heating elements 10 each having a removable cover 11 and all mounted in separate containers 12 that in turn are mounted on a rack 14. An electric pyrometer 16 can be connected to read the temperature in any one of the heating elements 10 by means of a selector switch 18. Heat-insulating material 19 surrounds each heating element 10 in container 12.

The electric circuit interconnecting pyrometer 16, thermocouples 22, and selector switch 18 is shown in Fig. 4.

As shown in Fig. 2, each heating element 10 consists of a metal tube 20 open at one end and closed at the other, a thermocouple 22 tapped into the closed end, electrical-resistance wire 24 wound around tube 20, electrical-insulating material 26 such as mica to insulate the resistance wire 24 from tube 20, and retaining ring 28 threaded onto the open end of tube 20 so that the heating element can be suspended from the top of a container 12. Thermocouple 22 is connected to pyrometer 16.

There is shown in Fig. 3 a double-pole double-throw switch 30 that connects the electrical-resistance winding 24 and pilot lights 32 and 34 to the electric-power supply comprising bus bars 37 and 38. When switch 30 is thrown to the right, as shown in the diagram, pilot light 32 and resistance winding 24 are connected in parallel with the power-supply bus bars 37 and 38. In this position, the temperature rises rapidly and the testing element is brought to the desired temperature. That temperature is selected when the instrument is originally made by the total resistance of winding used. Some rather large units have been brought to the desired temperature in one half hour. When the desired temperature is reached, switch 30 is thrown to the left, connecting a resistance 36 in series with winding 24 and lighting pilot lamp 34 instead of 32. The resistance 36 is adjusted to a value which maintains tube 20 and its contents at the desired temperature. The heating elements 10 have different resistances 24 so that they can be maintained at different temperatures within the range of the temperature indicator to be calibrated. The locations of switch 30 and pilot lights 32 and 34 on the instrument panel are shown in Fig. 1.

In calibrating a temperature indicator, each of the tubes 20 contains a bath which can be oil having a relatively high flash point for the lower temperatures or an appropriate fusible material for the higher temperatures, the bulb of the indicator to be calibrated being placed in one of these baths. The reading of the temperature indicator being tested is then compared with that of the pyrometer and adjustments of the indicator are made so that the readings of the indicator scale are brought into agreement with the pyrometer reading. The gauge can be calibrated over its entire range by inserting the bulbs successively in various heating elements and making similar adjustments.

It is to be understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

Thermometer-testing apparatus comprising a plurality of tubular housings defining a series of thermometer-testing chambers, electrical-resistance windings about each tube for heating the chambers each to a different temperature to form a series of graduated-temperature chambers, an adjustable resistor connecting each winding with an electrical source for regulating current flow through each winding to regulate the temperature of each chamber, a first signal light in series with each resistor, a shunt for by-passing each resistor and first signal light, a second signal light in series with each shunt, a switch for selectively connecting each winding with the corresponding resistor and first signal light or the corresponding shunt and second signal light, a thermocouple connected with each chamber, a pyrometer, and a selector switch for connecting the pyrometer with a selected thermocouple.

PHILIP MARTIN.

REFERENCES CITED

The following references are of record in the file of this patent:

UNITED STATES PATENTS

| Number | Name | Date |
|---|---|---|
| 1,336,728 | Christensen | Apr. 13, 1920 |
| 1,399,134 | Lothrop | Dec. 6, 1921 |
| 2,025,534 | Sheard et al. | Dec. 24, 1935 |
| 2,026,079 | White | Dec. 31, 1935 |
| 2,072,312 | Obermaier | Mar. 2, 1937 |
| 2,162,614 | Fry et al. | June 13, 1939 |
| 2,227,938 | Krebs | Jan. 7, 1941 |
| 2,299,867 | Wolfson | Oct. 27, 1942 |

OTHER REFERENCES

Publication, "Journal of Scientific Instruments," vol. 20, April 1943, pages 60–63. (Copy in 73–1 Div. 36.)